United States Patent
Kaniwa et al.

(10) Patent No.: US 9,514,251 B2
(45) Date of Patent: Dec. 6, 2016

(54) PUSH—SHOVE LAYOUT ROUTE CHANGING METHOD USING MOVEMENT TRACK OF FIGURE, COMPUTER-READABLE RECORDING MEDIUM RECORDING PUSH—SHOVE LAYOUT ROUTE CHANGING PROGRAM USING MOVEMENT TRACK OF FIGURE AND PUSH—SHOVE LAYOUT ROUTE CHANGING SYSTEM USING MOVEMENT TRACK OF FIGURE

(71) Applicant: FUJITSU LIMITED, Kawasaki-shi, Kanagawa (JP)

(72) Inventors: Tomo Kaniwa, Kawasaki (JP); Takahiko Orita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 755 days.

(21) Appl. No.: 13/771,216

(22) Filed: Feb. 20, 2013

(65) Prior Publication Data

US 2013/0346030 A1 Dec. 26, 2013

(30) Foreign Application Priority Data

Jun. 21, 2012 (JP) ................. 2012-140159

(51) Int. Cl.
*G06F 17/10* (2006.01)
*G06F 17/50* (2006.01)

(52) U.S. Cl.
CPC ........... *G06F 17/50* (2013.01); *G06F 17/5077* (2013.01); *G06F 2217/06* (2013.01)

(58) Field of Classification Search
CPC .................................. G06F 17/5077

USPC .......................................... 703/14, 2
See application file for complete search history.

(56) References Cited

U.S. PATENT DOCUMENTS

| | | | |
|---|---|---|---|
| 5,179,645 A | 1/1993 | Tanimori | |
| 5,327,528 A * | 7/1994 | Hidaka et al. | 715/858 |
| 6,219,068 B1 | 4/2001 | Kumada et al. | |
| 6,267,674 B1 * | 7/2001 | Kondo et al. | 463/32 |
| 6,321,131 B1 | 11/2001 | Kumada et al. | |
| 6,462,744 B1 * | 10/2002 | Mochida et al. | 345/543 |
| 6,652,384 B2 | 11/2003 | Kondo et al. | |
| 2001/0029202 A1 | 10/2001 | Kondo et al. | |
| 2002/0083407 A1 * | 6/2002 | Suzuki et al. | 716/13 |
| 2003/0014725 A1 * | 1/2003 | Sato et al. | 716/10 |

(Continued)

FOREIGN PATENT DOCUMENTS

| | | |
|---|---|---|
| JP | 2-132569 | 5/1990 |
| JP | 3-251971 | 11/1991 |

(Continued)

OTHER PUBLICATIONS

OrCAD® Layout User's Guide; Product Version 16.2; 1046 pp.; 2008.*

(Continued)

*Primary Examiner* — Hugh Jones
(74) *Attorney, Agent, or Firm* — Staas & Halsey LLP

(57) ABSTRACT

A changing method include: generating, by a computer, a movement track of a figure in response to movement of the figure; detecting an overlap between a line segment and the movement track; and changing, when the overlap is detected, the shape of a portion of the line segment that overlaps the movement track to a shape along an outer periphery of the movement track.

18 Claims, 12 Drawing Sheets

(56) References Cited

U.S. PATENT DOCUMENTS

2009/0132074 A1* 5/2009 Yamada .......................... 700/94
2009/0312850 A1* 12/2009 Higuchi et al. ................ 700/29

FOREIGN PATENT DOCUMENTS

| JP | 4-293169 | 10/1992 |
|---|---|---|
| JP | 7-334553 | 12/1995 |
| JP | 10-272258 | 10/1998 |

OTHER PUBLICATIONS

Ousterhout et al.; Magic: A VLSI Layout System; 33 pp; 1983.*
John K. Ousterhout, Gordon T. Hamachi, Robert N. Mayo, Walter S. Scott, and George S. Taylor, "Magic: A VLSI Layout System," 21st Design Automation Conference, 1984, pp. 152-159.*

* cited by examiner

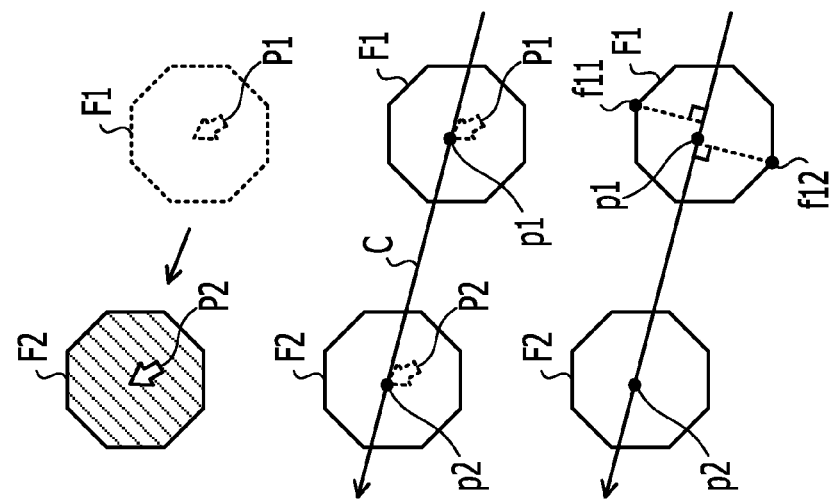
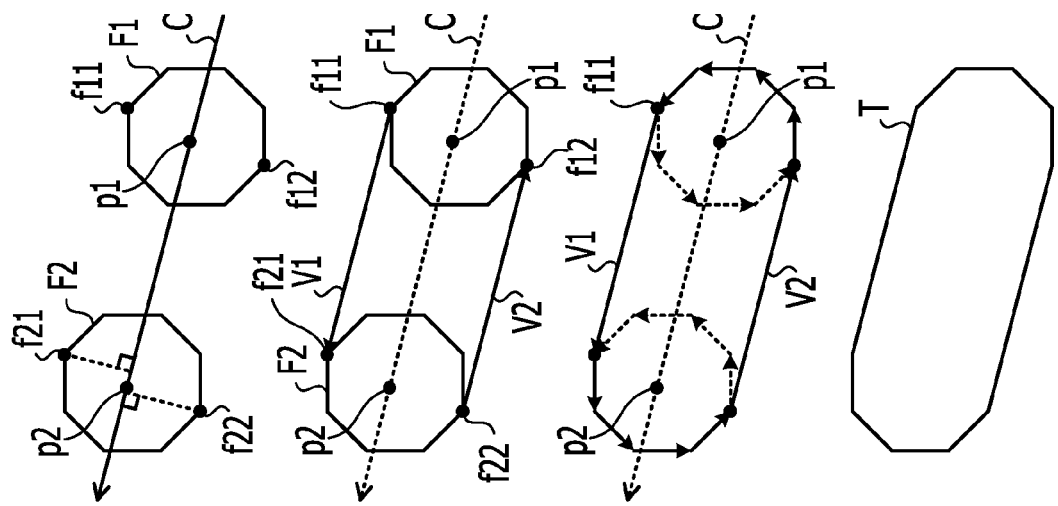
FIG. 5A  FIG. 5B  FIG. 5C  FIG. 5D  FIG. 5E  FIG. 5F  FIG. 5G

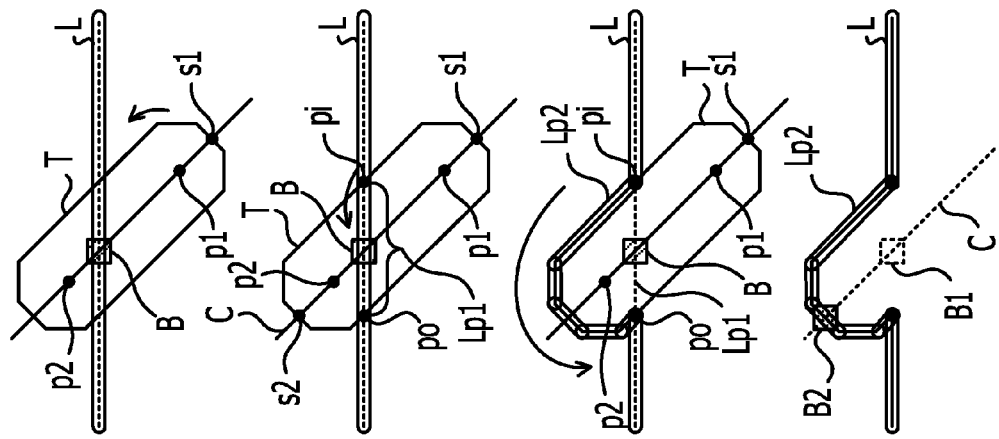
FIG. 7E
FIG. 7F
FIG. 7G
FIG. 7H
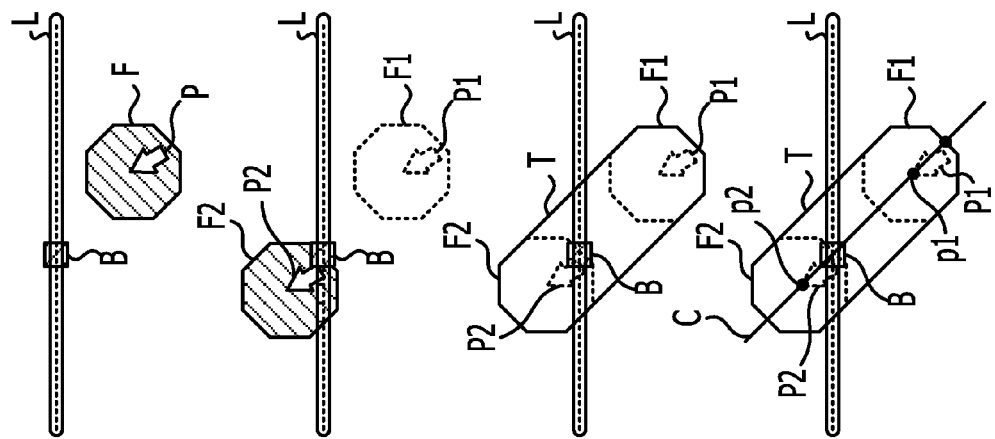
FIG. 7A
FIG. 7B
FIG. 7C
FIG. 7D

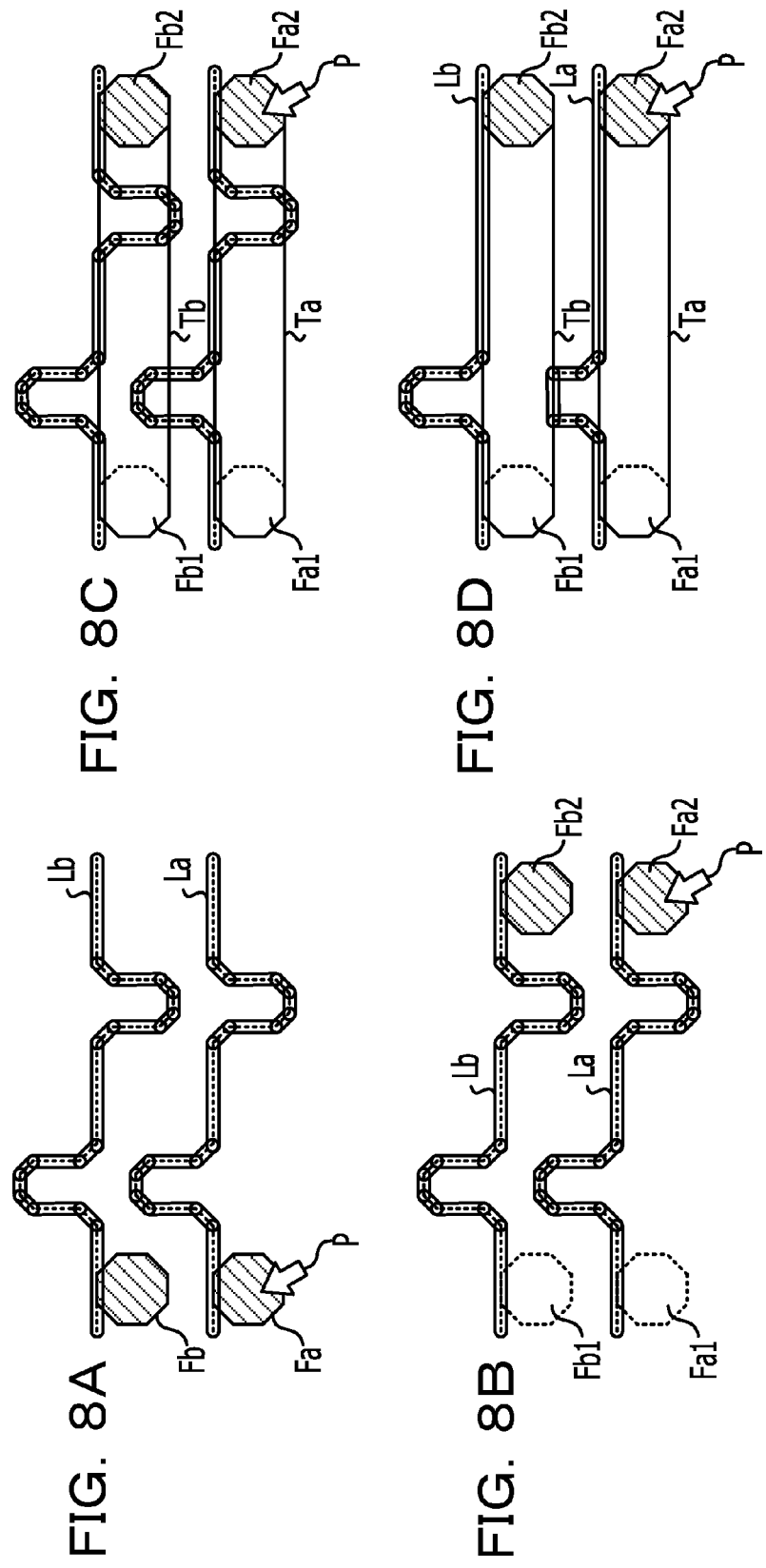

PUSH—SHOVE LAYOUT ROUTE CHANGING METHOD USING MOVEMENT TRACK OF FIGURE, COMPUTER-READABLE RECORDING MEDIUM RECORDING PUSH—SHOVE LAYOUT ROUTE CHANGING PROGRAM USING MOVEMENT TRACK OF FIGURE AND PUSH—SHOVE LAYOUT ROUTE CHANGING SYSTEM USING MOVEMENT TRACK OF FIGURE

CROSS-REFERENCE TO RELATED APPLICATION

This application is based upon and claims the benefit of priority of the prior Japanese Patent Application No. 2012-140159, filed on Jun. 21, 2012, the entire contents of which are incorporated herein by reference.

FIELD

The embodiment discussed herein is related to a changing method, a computer-readable recording medium recording a changing program, and a changing system.

BACKGROUND

In a layout change made by push-shove routing, a region called a push-shove closure, which is obtained by thickening one of wires having a clearance error by a certain width, is generated. The other one of the wires where the clearance error has occurred is shoved aside along the outer periphery of the push-shove closure.

Related art is disclosed in Japanese Laid-open Patent Publication No. 4-293169, 3-251971, 10-272258, or 7-334553.

SUMMARY

According to one aspect of the embodiments, a changing method include: generating, by a computer, a movement track of a figure in response to movement of the figure; detecting an overlap between a line segment and the movement track; and changing, when the overlap is detected, the shape of a portion of the line segment that overlaps the movement track to a shape along an outer periphery of the movement track.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 5A to 5G illustrate an exemplary movement track;
FIGS. 7A to 7H illustrate an exemplary routing transformation processing;
FIGS. 8A to 8D illustrate an exemplary routing transformation processing.

DESCRIPTION OF EMBODIMENT

A layout change made by push-shove routing is applied to a clearance error, and the shape of a push-shove closure depends on a route where the clearance error has occurred. For example, to transform the route to a shape desired by a user, one side of the route whose routing is to be changed is selected with a mouse or the like on a screen, the selected side is moved using the mouse or the like, and the length of the left and right sides is changed in accordance with the movement, thereby changing the route. For example, a folding point is added to a side whose routing is to be changed, thereby dividing the side. Accordingly, the route is changed.

A changing apparatus may perform a changing process on, for example, layout data of a circuit to be designed. A changing process may be performed on layout data, graphic data, or computer-aided-design (CAD) data of a circuit to be designed.

FIGS. 1A to 1G illustrate an exemplary routing transformation processing. Transform of routing illustrated in FIGS. 1A to 1G may be performed by the changing apparatus. Instead of the shape of a route where a clearance error has occurred, the user selects a figure with a shape, and shoving is executed by moving the selected figure. Thus, the routing is transformed, regardless of the presence of a clearance error. The changing apparatus may efficiently perform the routing transformation processing since the user moves and operates a figure with a shape intended by the user.

Figure 1:
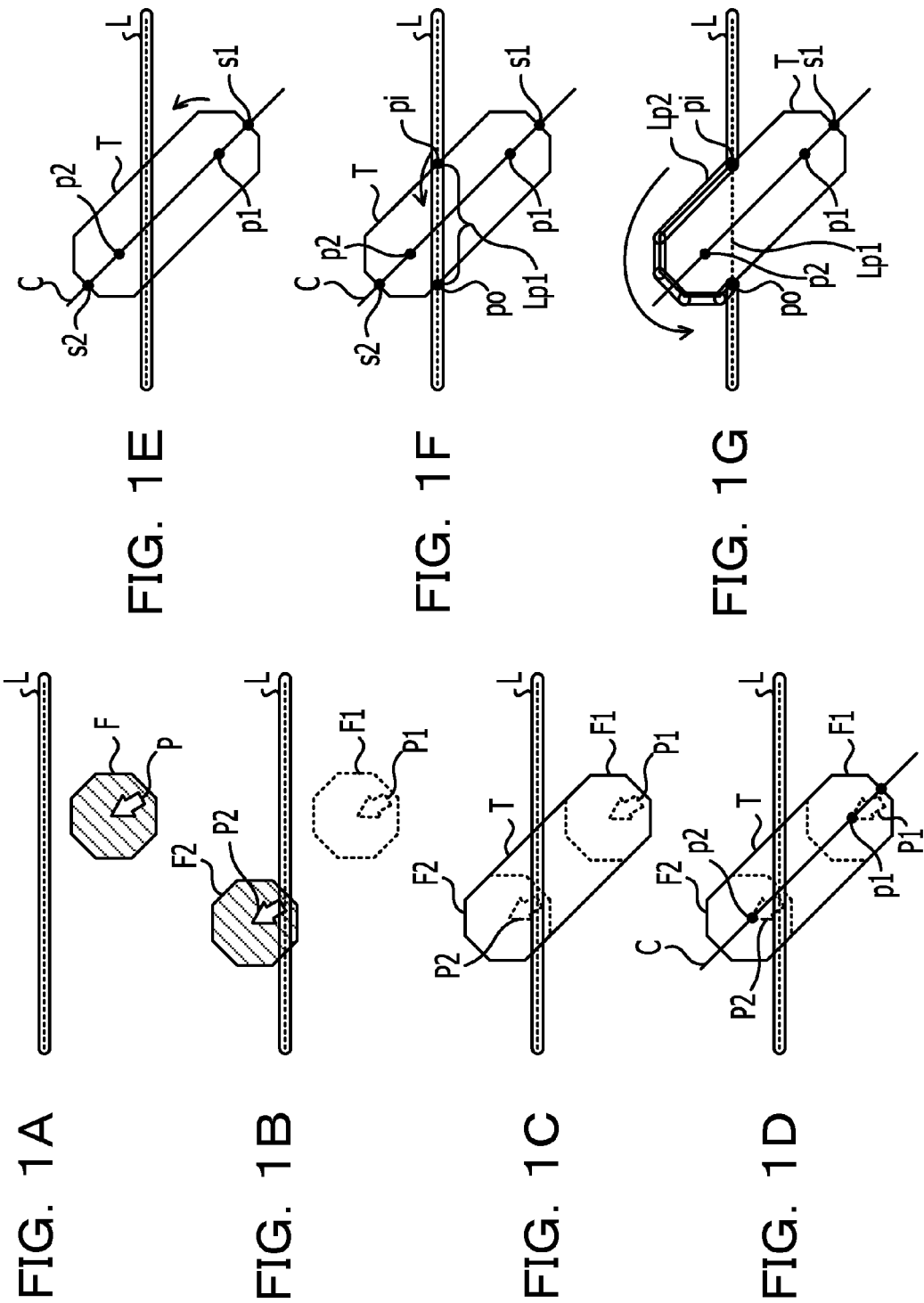
FIGS. 1A to 1G illustrate an exemplary routing transformation processing.

In FIG. 1A, a selected figure is arranged on layout data. For example, an octagon may be selected. The changing apparatus arranges a figure F at a desired position based on a mouse operation performed by the user. For example, the figure F is arranged near a signal line L by using a mouse pointer P.

In FIG. 1B, the figure F illustrated in FIG. 1A is moved. To simplify the description, the figure F and the mouse pointer P before the movement may be referred to as "F1" and "P1", respectively, by adding "1"; and the figure F and the mouse pointer P after the movement may be referred to as "F2" and "P2", respectively, by adding "2". Based on a mouse operation performed by the user, the changing apparatus moves the figure F1 by tracking the movement of the mouse pointer P1. For example, FIG. 1B illustrates the figure F2 and the mouse pointer P2 that have been moved onto the signal line L.

In FIG. 1C, a movement track T of the figure F is illustrated. When the changing apparatus moves the figure F as illustrated in FIGS. 1A and 1B, the changing apparatus generates a movement track T, from the figure F1 at the arranged position in FIG. 1A, which is before the movement, to the figure F2 at the arranged position in FIG. 1B, which is after the movement. For example, the movement track T may be generated overlapping the signal line L.

In FIG. 1D, a center line C in the movement track T is generated. The center line C may be a line segment that passes a position p1 of the mouse pointer P1 at the figure F1 before the movement and a position p2 of the mouse pointer P2 at the figure F2 after the movement.

In FIG. 1E, a start point s1 in the movement track T is determined. The start point s1 may be a point at which tracing of the outer periphery of the movement track T starts. The signal line L may be transformed in accordance with a pattern obtained by tracing the outer periphery of the movement tract T. For example, the start point s1 may be, of intersection points s1 and s2 between the center line C and the movement track T, the point of intersection that is in a direction opposite to the mouse pointer P2 at the figure F2, with respect to the mouse pointer P1 at the figure F1 before the movement, and that is farthest from P1. The changing apparatus traces the outer periphery of the movement track T in a counterclockwise direction from the start point s1. The point of intersection that is in a direction opposite to the mouse pointer P2 at the figure F2 after the movement, with respect to the mouse pointer P1 at the figure F1 before the movement, and that is farthest from P1 is set as the start point s1. Thus, the shape of the signal line L obtained by tracing the outer periphery of the movement track T may be drawn so as to be shoved aside in response to the movement of the figure F.

In FIG. 1F, tracing is completed. During tracing, a point that first intersects the signal line L may be referred to as an intrusion point pi. Of the signal line L, a portion that overlaps the movement track T may be referred to as a partial signal line Lp. When the intrusion point pi is detected, the changing apparatus switches the route to be traced from the outer periphery of the movement track T to a partial signal line Lp1, and traces the partial signal line Lp1. When the tracing position reaches the intersection between the movement track T and the signal line L, tracing is completed. A point of intersection between the partial signal line Lp and the movement track T, which is obtained by tracing the partial signal line Lp from the intrusion point pi, may be referred to as an outgoing point po.

In FIG. 1G, the partial signal line Lp is transformed. When the intrusion point pi and the outgoing point po are detected, the changing apparatus changes the shape of the partial signal line Lp1 to a route along the movement track T in a counterclockwise direction from the intrusion point pi to the outgoing point po. The partial signal line Lp, which is the changed route, may be denoted as Lp2. In this way, the changing apparatus transforms the signal line Lp1 in accordance with the shape of the figure F and the movement distance of the figure F.

Figure 2:
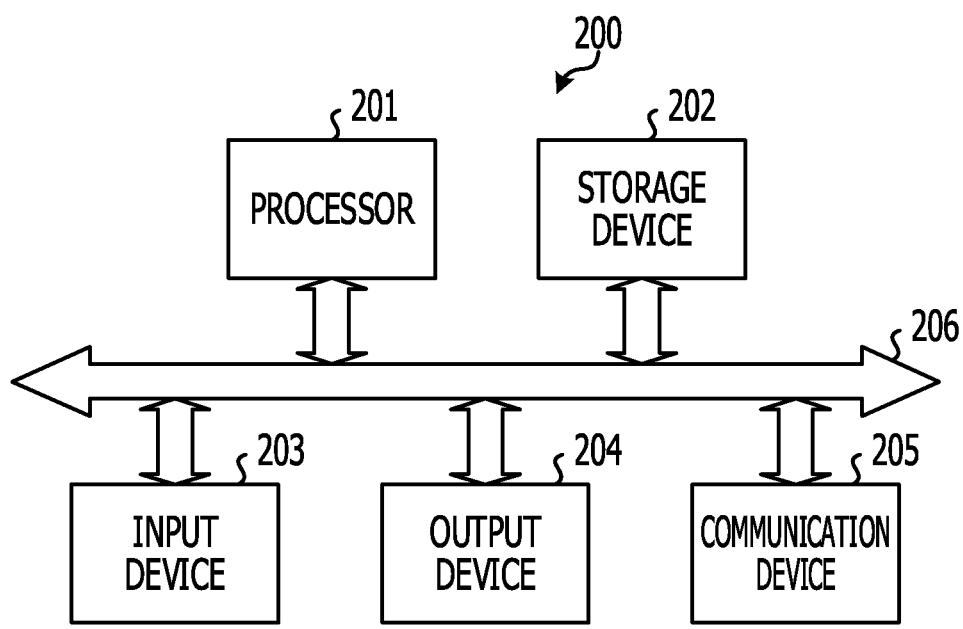
FIG. 2 illustrates an exemplary computer.

FIG. 2 illustrates an exemplary computer. The computer illustrated in FIG. 2 may have a hardware configuration. A changing apparatus 200 illustrated in FIG. 2 may be a computer including a processor 201, a storage device 202, an input device 203, an output device 204, and a communication device 205, which are coupled to a bus 206.

The processor 201 may control the overall changing apparatus 200. The processor 201 executes a program such as an operating system (OS) or a changing program stored in the storage device 202, reads data in the storage device 202, and writes the execution results to the storage device 202.

The storage device 202 may include a read-only memory (ROM), a random-access memory (RAM), a flash memory, a magnetic disk drive, or the like. The storage device 202 may be used as a work area for the processor 201. The storage device 202 may store a program such as an OS or a changing program, or data such as data obtained by executing each program.

The input device 203 may be an interface that inputs data based on an operation performed by a user who uses a keyboard, a mouse, a touch panel, or the like. The output device 204 may be an interface that outputs data based on an instruction from the processor 201. The output device 204 may include a display or a printer. The communication device 205 may be an interface that receives data from the outside via a network, or sends data to the outside.

Figure 3:
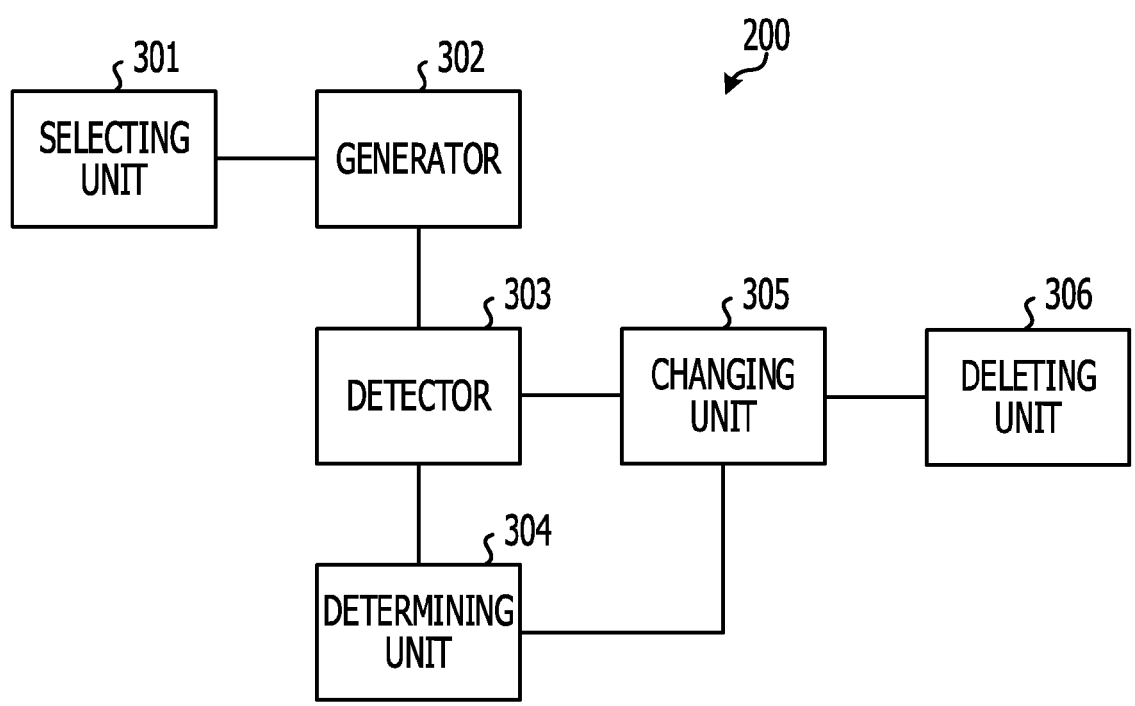
FIG. 3 illustrates an exemplary changing apparatus.

FIG. 3 illustrates an exemplary changing apparatus. In FIG. 3, the functional configuration of the changing apparatus 200 may be illustrated. The changing apparatus 200 includes a selecting unit 301, a generator 302, a detector 303, a determining unit 304, a changing unit 305, and a deleting unit 306. The selecting unit 301, the generator 302, the detector 303, the determining unit 304, the changing unit 305, and the deleting unit 306 may function by causing the processor 201 to execute a program stored in the storage device 202 illustrated in FIG. 2.

The selecting unit 301 may select, for example, a figure F. For example, the selecting unit 301 may select a figure F from among one or multiple figures F based on an operation of the input device 203. The shape of the figure F may be a polygon or a circle (including an ellipse). The size of the figure F may be arbitrarily set. The selecting unit 301 may select multiple figures F. Multiple figures F may be a group of figures of two or more types with different shapes, or a group of two or more figures of substantially the same type with substantially the same shape. When multiple figures F are selected, in accordance with movement of a certain one of the figures F based on an operation of the input device 203, the other figures F may move by tracking the movement of the certain one figure F.

Figure 4A:
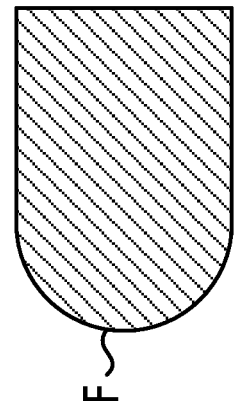
FIGS. 4A to 4C illustrate an exemplary figure.
Figure 4B:
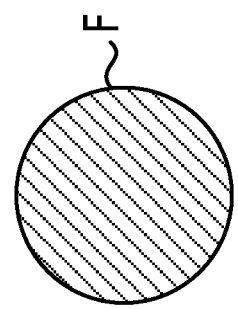
Figure 4C:
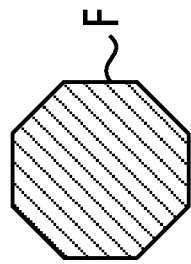

FIGS. 4A to 4C illustrate an exemplary figure. A figure F illustrated in FIG. 4A may be an octagon. A figure F illustrated in FIG. 4B may be a circle. A figure F illustrated in FIG. 4C may be a polygon with one or more of its sides being arc-shaped, such as one type of polygon. The group of figures is displayed together with layout data on a display screen of the output device 204, and one or more figures are selected from the group of figures based on an operation of the input device 203. The selected figure or figures is/are arranged on the layout data on the display screen.

The generator 302 illustrated in FIG. 3 generates the movement track of a figure based on a movement of the figure. For example, the generator 302 moves a figure selected by the selecting unit 301, based on an operation of the input device 203, and generates a movement track as a figure. For example, the generator 302 may generate the movement track illustrated in FIG. 1C based on operations illustrated in FIGS. 1A and 1B. The generator 302 may generate a movement track for each figure when multiple figures are selected.

FIGS. 5A to 5G illustrate an exemplary movement track. The generator 302 illustrated in FIG. 3 may generate the movement track illustrated in FIGS. 5A to 5G. FIGS. 5A to 5G may be diagrams illustrating the details of FIGS. 1B to 1D. FIGS. 5A to 5G may be in time series. In FIG. 5A, the figure F moves by tracking the movement of the mouse pointer P. For example, the generator 302 illustrated in FIG. 3 may hold the position p1 of the mouse pointer P1 before the movement and the position p2 of the mouse pointer P2 after the movement in the storage device 202. In FIG. 5B, the center line C is generated after the movement illustrated in FIG. 5A. The center line C which passes the positions p1 and p2 held in FIG. 5A is generated.

In FIG. 5C, reference points f11 and f12 that set the outer periphery of the movement track T are determined in the figure F1 before the movement. In the interior of the figure F1 before the movement, points on the outer periphery of the figure F1 before the movement that are positioned farthest from the center line C are set as the reference points f11 and f12. The reference points f11 and f12 may be two points set on both sides of the center line C.

In FIG. 5D, reference points f21 and f22 that set the outer periphery of the movement track T are determined in the figure F2 after the movement. In the interior of the figure F2 after the movement, points on the outer periphery of the figure F2 after the movement that are positioned farthest from the center line C are set as the reference points f21 and f22. The reference points f21 and f22 may be two points set on both sides of the center line C.

In FIG. 5E, after the processing in FIG. 5D, the reference points, set on both sides of the center line C, in the figure F1 before the movement and the figure F2 after the movement are coupled by vectors. For example, the generator 302 illustrated in FIG. 3 generates a vector V1 from one reference point f11 in the figure F1 before the movement to one reference point f21 in the figure F2 after the movement, and generates a vector V2 from the other reference point f22 in the figure F2 after the movement to the other reference point f12 in the figure F1 before the movement.

In FIG. 5F, after the processing in FIG. 5E, the generator 302 illustrated in FIG. 3 performs tracing in accordance with the direction of the vector V1, from one reference point f11 as a start point in the figure F1 before the movement. When tracing returns to the reference point f11 serving as the start point, the generator 302 stops tracing. In FIG. 5G, the movement track T generated by performing tracing illustrated in FIG. 5F is illustrated. The movement track T may be generated by other generating methods.

The detector 303 illustrated in FIG. 3 detects the overlap between a line segment and the movement track T generated by the generator 302. For example, the detector 303 detects, as illustrated in FIG. 1C, the overlap between the signal line L and the movement track T. When multiple figures F are selected, an overlap is detected for the movement track T of each of the figures F.

The determining unit 304 illustrated in FIG. 3 determines whether the line segment with which an overlap has been detected by the detector 303 is transformable. For example, when attribute information is set for the signal line L serving as the line segment, the determining unit 304 refers to the attribute information of the signal line L with which an overlap has been detected, thereby determining whether the signal line L is transformable. For example, when "untransformable" is set in the attribute information of the signal line L with which an overlap has been detected, the determining unit 304 may determine that the signal line L is untransformable in the case where an overlap with the movement track T is detected. When "transformable" is set in the attribute information, the determining unit 304 may determine that the signal line L is transformable in the case where an overlap with the movement track T is detected.

The attribute information of the signal line L may be set based on an operation input from the input device 203. For example, when one of multiple signal lines L is transformed, the changing apparatus 200 may set attribute information of this signal line L as "transformable". Attribute information of untransformed signal lines L may be set as "untransformable".

When an overlap is detected by the detector 303, the changing unit 305 changes the shape of a portion of the line segment that overlaps the movement track T to a shape along the outer periphery of the movement track T. When the determining unit 304 is mounted, if the detector 303 detects an overlap and the determining unit 304 determines that the line segment is transformable, the changing unit 305 changes a portion of the line segment that overlaps the movement track T to a shape along the outer periphery of the movement track T.

For example, the changing unit 305 changes the shape of the portion of the line segment to a shape formed by a a route from a first intersection point between the movement track T and the line segment to a second intersection point between the movement track T and the line segment via the outer periphery of the figure after the movement in the movement track T. For example, as illustrated in FIG. 1E or FIG. 1F, the changing unit 305 sets a start point s1, traces the outer periphery of the movement track T from the start point s1, traces the partial signal line Lp1 from the intrusion point pi, and completes tracing at the outgoing point po. As illustrated in FIG. 1G, the changing unit 305 changes the shape of the partial signal line Lp1 to the partial signal line Lp2.

When there is a prohibited figure prohibited to be transformed in the portion of the line segment, the prohibited figure is moved by tracking transformation of the portion of the line segment. The prohibited figure is a figure element prohibited to be transformed, which may correspond to, for example, a via or a circuit component on layout data. Although the prohibited figure, which is prohibited to be transformed, is not transformed, the prohibited figure may be moved by tracking transformation of the signal line L.

The deleting unit 306 deletes a loop shape from the shape of the line segment changed by the changing unit 305. Because a route becoming a loop shape may be a redundant route, the deleting unit 306 detects and deletes a loop shape. Accordingly, redundancy of the signal line L may be reduced, and the circuit area may be efficiently utilized.

Figure 6A:
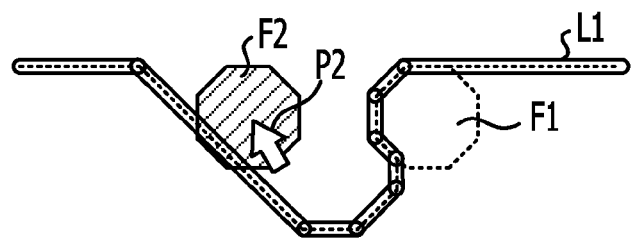
FIGS. 6A to 6D illustrate an exemplary processing performed by a deleting unit.
Figure 6B:
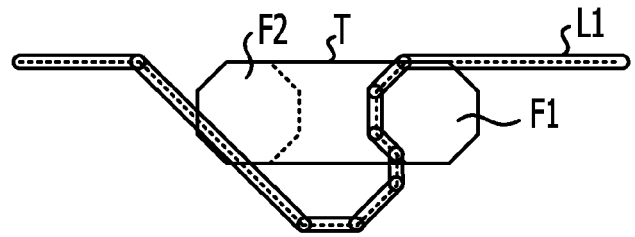
Figure 6C:
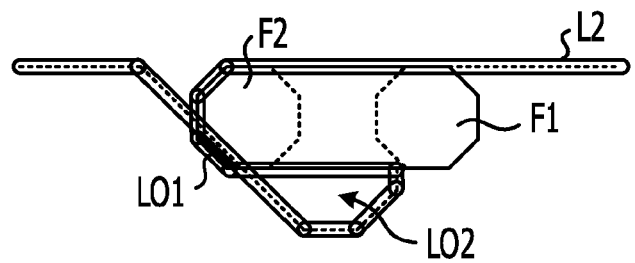
Figure 6D:
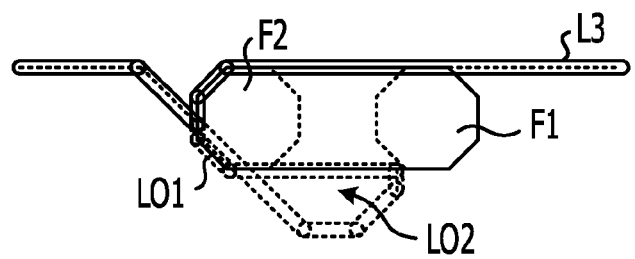

FIGS. 6A to 6D illustrate an exemplary processing performed by the deleting unit 306. In FIGS. 6A to 6D, the deleting unit 306 illustrated in FIG. 3 may delete a loop shape. FIGS. 6A to 6D may be in time series. In FIG. 6A, the figure F moves by tracking the movement of a signal line L1 and the mouse pointer P. In FIG. 6B, the movement track T is generated by the movement illustrated in FIG. 6A. In FIG. 6C, the signal line L1 is transformed to a signal line L2 based on the movement track T illustrated in FIG. 6B. In FIG. 6C, twp loop shapes LO1 and LO2 are detected in the signal line L2. In FIG. 6D, the loop shapes LO1 and LO2 detected in FIG. 6C are deleted from the signal line L2, and the signal line L2 becomes a signal line L3. Accordingly, redundancy of the signal line L may be reduced, and the circuit area may be efficiently utilized.

FIGS. 7A to 7H illustrate an exemplary routing transformation processing. In FIGS. 7A to 7H, when a prohibited figure, prohibited to be transformed, exists on a signal line, the signal line is shoved aside. FIGS. 7A to 7H may be in time series. In FIG. 7A, a selected figure F is arranged on layout data. The changing apparatus 200 arranges the figure F at a position desired by a user, based on a mouse operation performed by the user. For example, the figure F is arranged near the signal line L by the mouse pointer P. A via B serving as a prohibited figure may be arranged on the signal line L.

In FIG. 7B, the figure F illustrated in FIG. 7A moves. The changing apparatus 200 moves a figure F1 by tracking the movement of the mouse pointer P1 based on a mouse operation performed by the user. For example, a figure F2 and a mouse pointer P2 moved onto the signal line L are illustrated.

In FIG. 7C, the movement track T of the figure F is illustrated. As illustrated in FIGS. 7A and 7B, when the figure F moves, the changing apparatus 200 generates the movement track T, from the figure F1 at the arranged position in FIG. 7A, which is before the movement, to the figure F2 at the arranged position in FIG. 7B, which is after the movement. For example, the movement track T may be generated overlapping the signal line L.

In FIG. 7D, the center line C in the movement track T is generated. The center line C may be a line segment that passes the position p1 of the mouse pointer P1 at the figure F1 before the movement and the position p2 of the mouse pointer P2 at the figure F2 after the movement.

In FIG. 7E, the start point s1 in the movement track T is determined. The signal line L may be transformed in accordance with a pattern obtained by tracing the outer periphery of the movement tract T. For example, the start point s1 may be, of the intersection points s1 and s2 between the center line C and the movement track T, the point of intersection that is in a direction opposite to the mouse pointer P2 at the figure F2, with respect to the mouse pointer P1 at the figure F1 before the movement, and that is farthest from P1. The changing apparatus 200 traces the outer periphery of the movement track T in a counterclockwise direction from the start point s1. The point of intersection that is in a direction opposite to the mouse pointer P2 at the figure F2 after the movement, with respect to the mouse pointer P1 at the figure F1 before the movement, and that is farthest from P1 is set as the start point s1. Thus, the shape of the signal line L obtained by tracing the outer periphery of the movement track T may be rendered as being shoved aside in response to the movement of the figure F.

In FIG. 7F, completion of tracing is illustrated. When the intrusion point pi is detected, the changing apparatus 200 switches the route to trace from the outer periphery of the movement track T to the partial signal line Lp1, and traces the partial signal line Lp1. When the tracing position reaches the outgoing point po, which is the point of intersection between the movement track T and the signal line L, tracing is completed.

In FIG. 7G, a transformed state of the partial signal line Lp is illustrated. When the intrusion point pi and the outgoing point po are detected, the changing apparatus 200 changes the shape of the partial signal line Lp1, from the intrusion point pi to the outgoing point po, to a route along the movement track T in a counterclockwise direction. The partial signal line Lp, which is the changed route, is set as Lp2. Thus, the changing apparatus 200 may transform the signal line Lp1 in accordance with the shape of the figure F and the movement distance of the figure F. Since the via B is a prohibited figure, which is prohibited to be transformed, the via B may not be transformed.

In FIG. 7H, after the processing in FIG. 7G, the via B moves. The changing unit 305 moves the via B in parallel to the direction of the center line C, which is the movement direction of the mouse pointer P, and re-arranges the via B at the position of the transformed partial signal line Lp2. For example, when the via B does not exist on the center line C, the via B may be re-arranged at the point of intersection between the parallel line of the center line C and the partial signal line Lp2. When an untransformable figure element such as a via or a circuit component overlaps the movement track T, movement that tracks the transformation of the partial signal line is performed.

FIGS. 8A to 8D illustrate an exemplary routing transformation processing. In FIGS. 8A to 8D, shoving is performed based on multiple figures. FIGS. 8A to 8D may be in time series. In FIG. 8A, figures Fa and Fb selected by the mouse pointer P are arranged on layout data. For example, two figures Fa and Fb are selected. One figure Fa is arranged at the position of the mouse pointer P, and the other figure Fb is arranged at a position distant from the figure Fa in a certain direction and by a certain distance. The other figure Fb may move by tracking the movement of the figure Fa.

In FIG. 8B, the group of figures illustrated in FIG. 8A moves. The changing apparatus 200 moves one figure Fa by tracking the movement of the mouse pointer P based on a mouse operation performed by the user. The other figure Fb is moved by tracking the movement of the figure Fa.

In FIG. 8C, movement tracks Ta and Tb of the figures Fa and Fb, respectively, are illustrated. When the group of figures moves by performing processing in FIG. 8B, the changing apparatus 200 generates the movement tracks Ta and Tb, from figures Fa1 and Fb1 at the arranged positions in FIG. 8A, which are before the movement, to figures Fat and Fb2 at the arranged positions in FIG. 8B, which are after the movement. In FIG. 8D, signal lines La and Lb shoved aside based on the movement tracks Ta and Tb are illustrated. Of the signal lines La and Lb, portions that overlap the movement tracks Ta and Tb are shoved aside.

Figure 9:
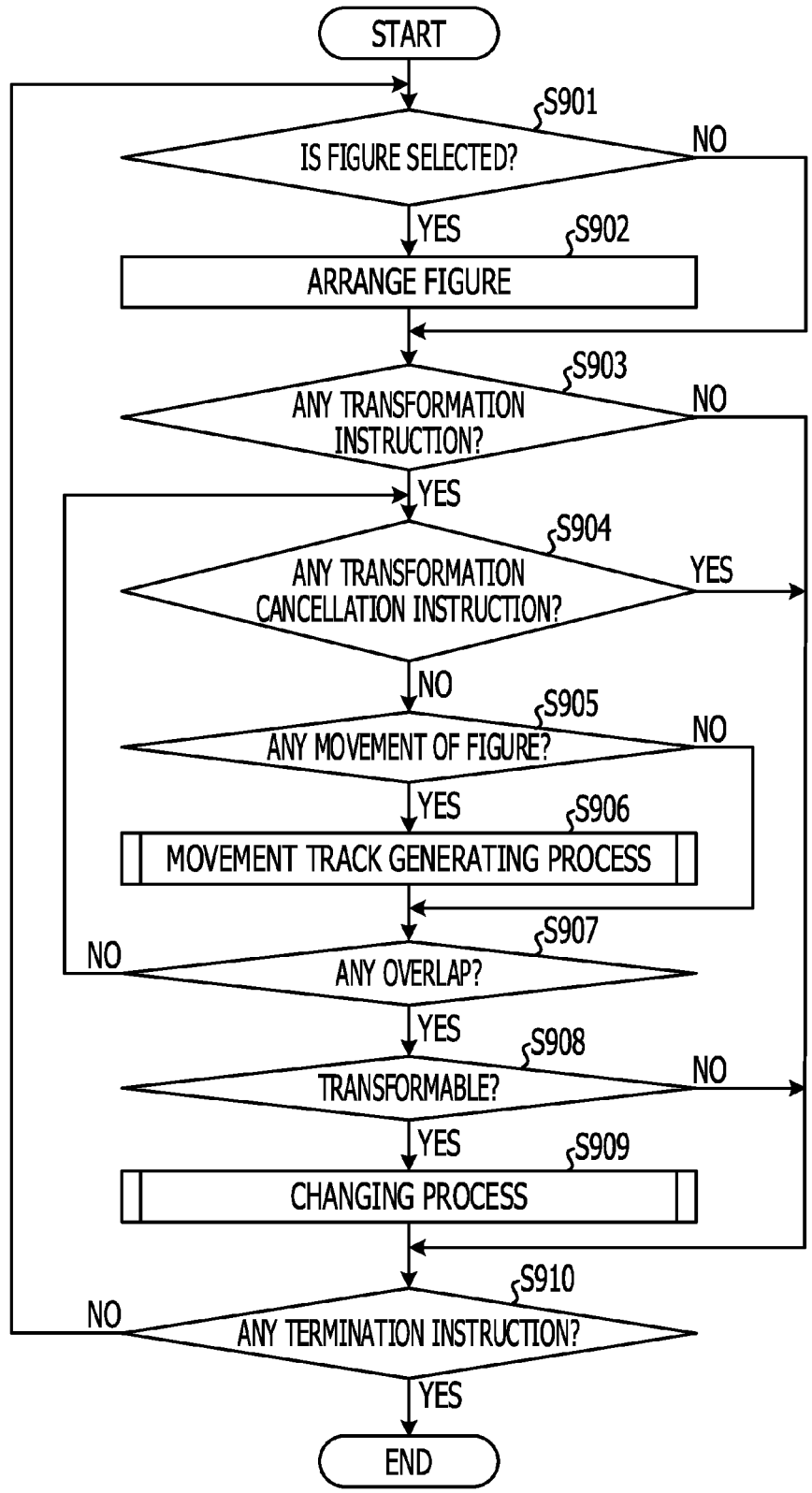
FIG. 9 illustrates an exemplary routing transformation process.

FIG. 9 illustrates an exemplary routing transformation process. The changing apparatus 200 illustrated in FIG. 2 or FIG. 3 may perform the transformation process illustrated in FIG. 9. The selecting unit 301 illustrated in FIG. 3 determines whether a figure F is selected (an operation S901). When no figure F is selected (operation S901: No), the process proceeds to an operation S903. When a figure F is selected (operation S901: Yes), the selected figure F is arranged at the position of the mouse pointer P (an operation S902).

Whether a transformation instruction is accepted in response to an operation of the input device 203, such as clicking the mouse, which is the input device 203, is determined (an operation S903). Until a transformation instruction is accepted, the figure F moves, based on an operation of the input device 203, without transforming the signal line L. When no transformation instruction is accepted (operation S903: No), the process proceeds to an operation S910. When a transformation instruction is accepted (operation S903: Yes), whether a transformation cancellation instruction from the input device 203 is accepted is determined (an operation S904). A transformation cancellation instruction may be an instruction that cancels a transformable state in response to a transformation instruction. When a transformation cancellation instruction is accepted (an operation S904: Yes), the process proceeds to the operation S910.

When no transformation cancellation instruction is accepted (operation S904: No), whether there is movement of the figure F is determined (an operation S905). When there is no movement of the figure F (operation S905: No), the process proceeds to an operation S907. When there is movement of the figure F (operation S905: Yes), the generator 302 executes a movement track generating process (an operation S906). In the movement track generating process (operation S906), the above-described movement track is generated.

After the movement track generating process (operation S906), the detector 303 illustrated in FIG. 3 detects the overlap between the signal line L and the movement track T (an operation S907). When there is no overlap (operation S907: No), the process returns to the operation S904. When there is an overlap (operation S907: Yes), the determining unit 304 determines whether transformation is allowed (an operation S908). When transformation is not allowed (operation S908: No), the process proceeds to the operation S910. When transformation is allowed (operation S908: Yes), the changing unit 305 executes a changing process (operation S909).

Whether a termination instruction is given from the input device 203 is determined (operation S910). When no termination instruction is given (operation S910: No), the process returns to operation S901, and a figure F is selected. When a termination instruction from the input device 203 is accepted (operation S910: Yes), a series of operations is terminated.

Figure 10:
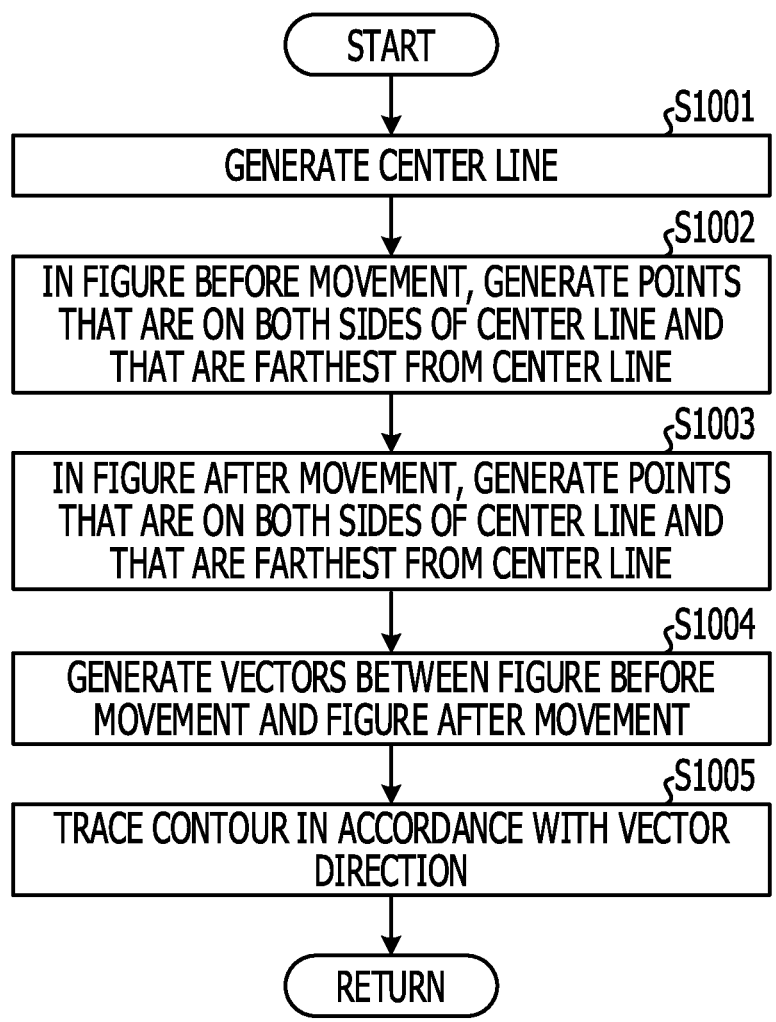
FIG. 10 illustrates an exemplary movement track generating process.

FIG. 10 illustrates an exemplary movement track generating process. The movement track generating process illustrated in FIG. 10 may correspond to the movement track generating process (operation S906) illustrated in FIG. 9. For example, as illustrated in FIG. 5B, a center line C is generated from figures F before and after the movement (an operation S1001). For example, as illustrated in FIG. 5C, a pair of reference points (f11 and f12) is generated in a figure F1 before the movement (an operation S1002). For example, as illustrated in FIG. 5D, a pair of reference points (f21 and f22) is generated in a figure F2 after the movement (an operation S1003). For example, as illustrated in FIG. 5E, vectors V1 and V2 are generated (an operation S1004). For example, as illustrated in FIG. 5F, a movement track T is generated based on tracing in the direction of the vector V1 (an operation S1005).

Figure 11:
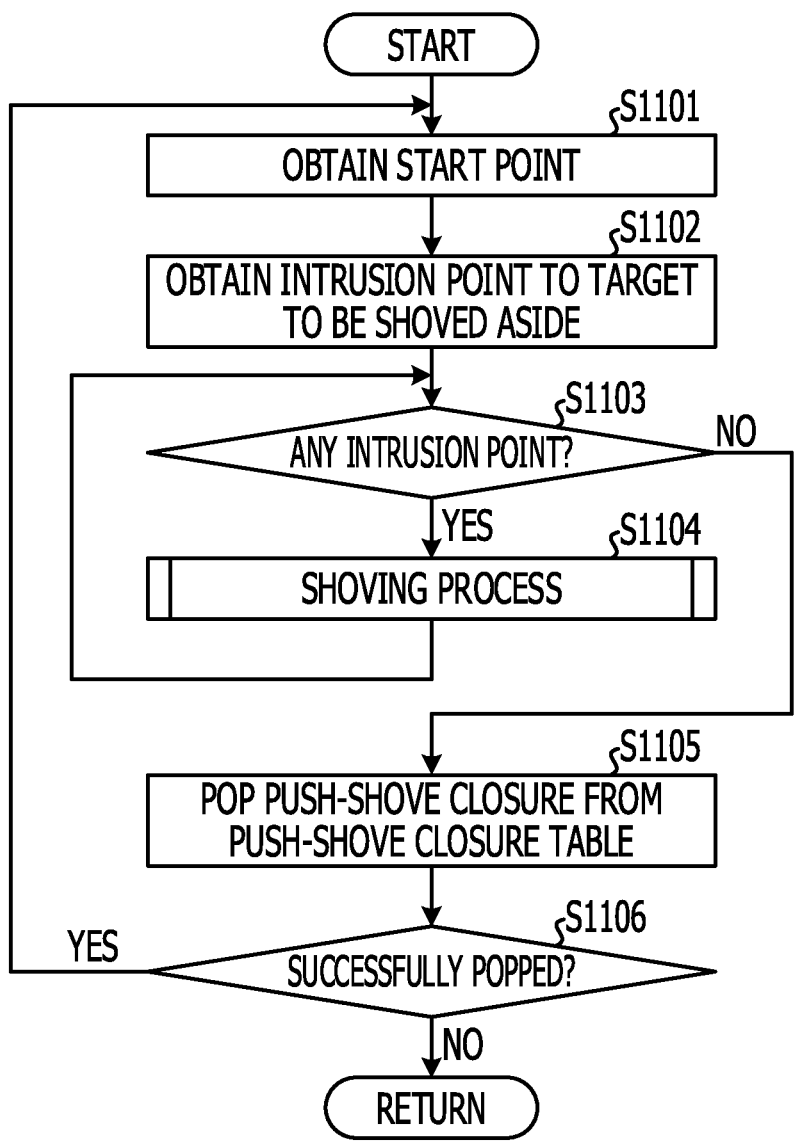
FIG. 11 illustrates an exemplary routing transformation process.

FIG. 11 illustrates an exemplary routing changing process. The changing process illustrated in FIG. 11 may correspond to the changing process (operation S909) illustrated in FIG. 9. A start point s1 is obtained (an operation S1101). An intrusion point pi is obtained by performing tracing from the start point s1 (an operation S1102). When the intrusion point pi is detected (an operation S1103: Yes), a routing transformation process is executed (operation S1104). The process returns to the operation S1103.

When no intrusion point pi is detected (operation S1103: No), for example, when tracing returns to the start point s1, a push-shove closure, which is obtained by thickening, by a certain width, a signal line where a clearance error has occurred, is popped from a push-shove closure table in the storage device 202 (operation S1105). When the push-shove closure is popped (operation S1106: Yes), the process returns to operation S1101. When the push-shove closure is not popped (operation S1106: No), the changing process ends.

Figure 12:
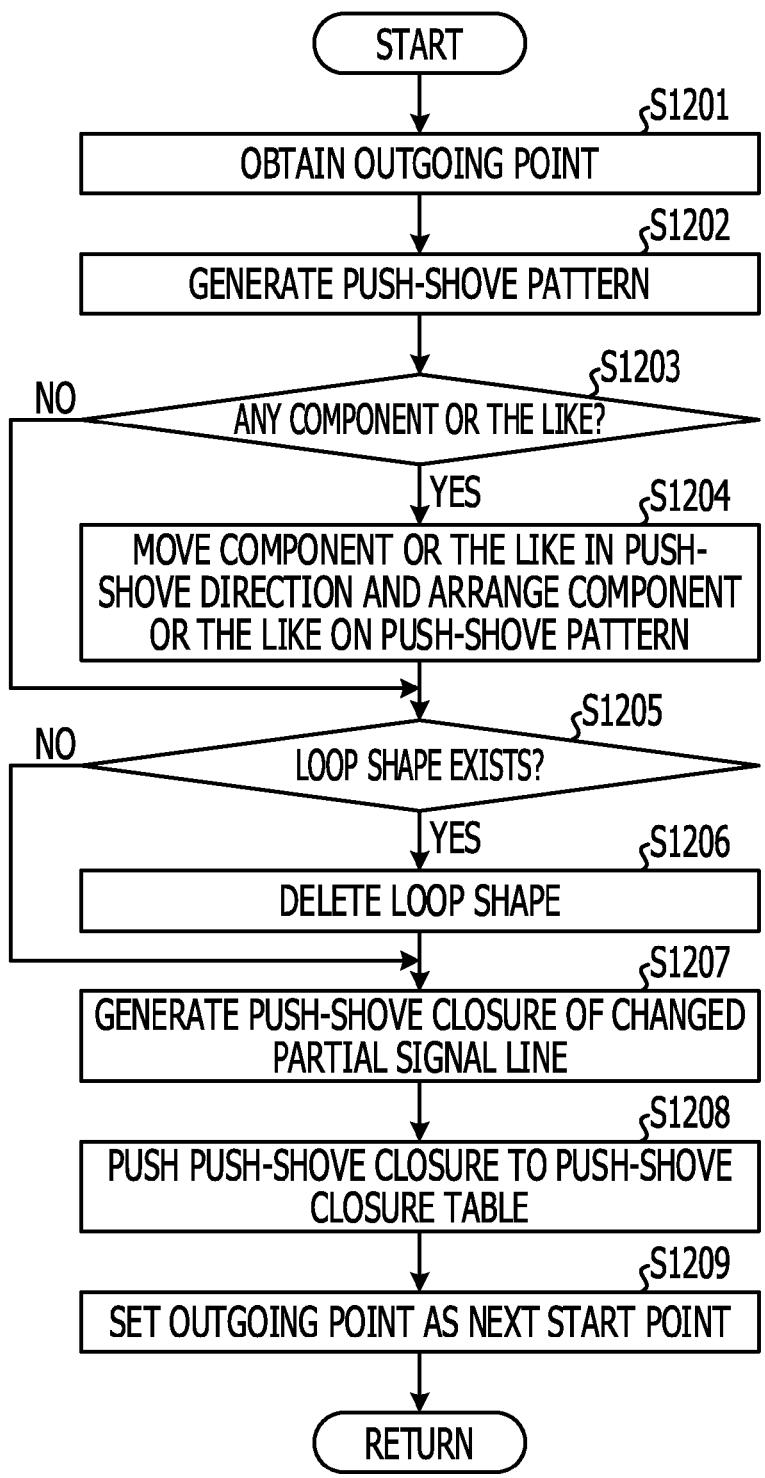
FIG. 12 illustrates an exemplary routing transformation process.

FIG. 12 illustrates an exemplary routing transformation process. The routing transformation process (an operation S1104) illustrated in FIG. 11 may be executed by the changing unit 305 illustrated in FIG. 3. In tracing from the intrusion point pi via the partial signal line Lp1, an outgoing point po is obtained (an operation S1201). When tracing reaches the outgoing point po, a push-shove pattern is generated (an operation S1202). The push-shove pattern may be a route of the movement track T in a counterclockwise direction from the intrusion point pi to the outgoing point po.

Whether a circuit component or a via (hereinafter referred to as a "component or the like") exists in the movement track T is determined (an operation S1203). When a component or the like does not exist (operation S1203: No), the process proceeds to an operation S1205. When a component or the like exists (operation S1203: Yes), the component or the like is moved in a push-shove direction and is arranged on the push-shove pattern (an operation S1204).

Whether a loop shape based on the change exists is determined (operation S1205). When no loop shape exists (operation S1205: No), the process proceeds to an operation S1207. When a loop shape exists (operation S1205: Yes), the loop shape is deleted (an operation S1206), and the process proceeds to operation S1207. A push-shove closure, which is obtained by thickening, by a certain width, a changed partial signal line corresponding to the push-shove pattern, is generated (an operation S1207). The generated push-shove closure is pushed to the push-shove closure table (an operation S1208).

The outgoing point po is set as the next start point (an operation S1209). The routing transformation process (operation S1104) ends. Since the process returns to the operation S1103, in the operation S1102, an intrusion point is obtained for the generated push-shove closure.

Because a signal line is shoved aside based on the movement track of a figure, the shape of the signal line may transform in accordance with the outer periphery shape of the movement track. Therefore, a changed shape intended by a user may be obtained. Because the signal line is transformed by moving a figure in response to an operation of the input device 203, an operation performed by the user, such as selection or division of the signal line, or setting of a folding point, may not be performed. Thus, the layout change may become more efficient.

Because multiple figures are moved in response to a common operation, to-be-changed portions of multiple signal lines are changed at one time. Thus, the layout change may become more efficient. Because the push-shove pattern is generated via the outer periphery of the moved figure, transformation is performed as if the signal line were shoved aside in response to movement of the figure by operating the input device 203.

When a signal line to be transformed and a signal line not to be transformed both exist at the same time, even if the signal line not to be transformed overlaps the movement track, the signal line may not be transformed. Therefore, the figure is moved by operating the input device 203, regardless of the overlap between the movement track and the signal line not to be transformed.

When a figure element prohibited to be transformed, such as a via or a circuit component, exists in the movement track, the figure element is arranged on the transformed signal line by tracking the transformation of the signal line. Therefore, an operation of the input device 203 to additionally move a figure element prohibited to be transformed, such as a via or a circuit component, may become unnecessary. Thus, the layout change may become more efficient. Because loop shapes are deleted, redundancy of the signal line may be reduced, and the circuit area may be efficiently utilized.

A figure may be moved by a mouse pointer. When the input device 203 is a touch panel, a figure may be moved in response to the gesture of a fingertip or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A push-shove layout route changing method comprising:

generating, by a computer, a movement track of a figure in response to movement of the figure from a start point to an end point;

tracing an outer periphery of the movement track in an area including one of a line segment and a curve;

detecting two intersection points at which the movement track and one of the line segment and the curve intersect;

changing, when the two intersection points are detected, a shape and a position of a portion of the one of the line segment and the curve between the two intersection points to a shape and a position along the outer periphery of the movement track so as to change layout data including the one of the line segment and the curve; and deleting a loop obtained by the portion having a charged shape an a changed position coming in contact with another line segment in the area.

2. The push-shove layout route changing method according to claim 1, further comprising:

generating a movement track group including, a plurality of movement tracks corresponding to, respectively, a plurality of figures which are included in a figure group corresponding to the figure; and detecting the two intersection points at which each of plurality of movement tracks and each of one of a plurality of line segments included in a line segment group corresponding to the line segment and a plurality of curves included in a curve group corresponding to the curve.

3. The push-shove layout route changing method according to claim 1 further comprising, changing the shape of the portion to a shape formed by a route along the outer periphery of the movement track in a counterclockwise direction from a first intersection point of the two intersection points to a second intersection point of the two intersection points.

4. The changing method according to claim 1, the method further comprising:

determining whether the portion is transformable; and changing the shape of the portion to the shape along the outer periphery of the movement track.

5. The push-shove layout route changing method according to claim 1, the method further comprising, moving when a prohibited figure prohibited to be transformed exists on the portion, the prohibited figure following the changing of the shape of the portion.

6. The push-shove layout route changing method according to claim 5, wherein the line segment is a signal line on the layout data of a circuit to be designed, and wherein the prohibited figure is a circuit component or a via on the layout data.

7. The push-shove layout route changing method according to claim 1, wherein the line segment is a signal line on the layout data of a circuit to be designed.

8. A non-transitory computer-readable recording medium recording a push-shove layout route changing program to be executed by a computer, the changing program causing the computer to execute operations of:

generating a movement track of a figure in response to movement of the figure from a start point to an end point;

tracing an outer periphery of the movement track in an area including one of a line segment and a curve;

detecting two intersection points at which the movement track and one of the line segment and the curve intersect;

changing, when the two intersection points are detected, a shape and a position of a portion of the one of the line segment and the curve between the two intersection points to a shape and a position along an outer periphery of the movement track so as to change layout data including the one of the line segment and the curve; and deleting a loop obtained by the portion having a changed shape and changed position coming in contact with another line segment in the area.

9. The non-transitory computer-readable recording medium according to claim 8, further comprising:

generating a movement track group including a plurality of movement tracks corresponding to respectively, a plurality of figures which are included in a figure group corresponding to the figure; and detecting the two intersection points at which each of the plurality of movement tracks and each of one of a plurality of line segments included in a line segment group corresponding to the line segment and a plurality of curves included in a curve group corresponding to the curve.

10. The non-transitory computer-readable recording medium according to claim 8 further comprising, changing the shape of the portion to a shape formed by a route along the outer periphery of the movement track in a counterclockwise direction from a first intersection point of the two intersection points to a second intersection point of the two intersection points.

11. The non-transitory computer-readable recording medium according to claim 8, the method further comprising:

determining whether the portion is transformable; and changing the shape of the portion to the shape along the outer periphery of the movement track.

12. The non-transitory computer-readable recording medium according to claim 8, the method further comprising, moving, when a prohibited figure prohibited to be transformed exists on the portion, the prohibited figure following the changing of the shape of the portion.

13. The non-transitory computer-readable recording medium according to claim 12, wherein the line segment is a signal line on the layout data of a circuit to be designed, and wherein the prohibited figure is a circuit component or a via, on the layout data.

14. The non-transitory computer-readable recording medium according to claim 8, wherein the line segment is a signal line on the layout data of a circuit to be designed.

15. A push-shove layout mute changing system comprising:

a changing apparatus that changes a shape of a line segment; and a processor that controls the changing apparatus, wherein the changing apparatus, under a control of a processor, performs operations to:

generate a movement track of a figure in response to movement of the figure from a start point to an end point;

trace an outer periphery of the movement track in an area including one of a line segment and a curve;

detect two intersection points at which the movement track and one of the line segment and the curve intersect;

change, when the two intersection points are detected, a shape and a position of a portion of the one of the line segment and the curve between the two intersection points to a shape and a position along an outer periphery of the movement track so as to change layout data including the one of the line segment and the curve; and delete a loop obtained by the portion having a changed shape and a changed position coming in contact with another line segment in the area.

16. The push-shove layout route changing system according to claim 15, wherein the changing apparatus receives a change instruction from outside the push-shove layout route changing system.

17. The push-shove layout route changing system according to claim 15, wherein the changing apparatus moves, when a prohibited figure prohibited to be transformed exists on the portion, the prohibited figure following the changing of the shape of the portion.

18. The push-shove layout route changing system according to claim 17, wherein the line segment is a signal line on the layout data of a circuit to he designed, and wherein the prohibited figure is a circuit component or a via on the layout data.

* * * * *